United States Patent [19]

Winkler

[11] Patent Number: 4,590,357
[45] Date of Patent: May 20, 1986

[54] VEHICULAR ARC WELDER

[76] Inventor: Harry L. Winkler, Box 632, Pinehurst, Id. 83850

[21] Appl. No.: 472,288

[22] Filed: Mar. 7, 1983

[51] Int. Cl.⁴ ............................................. B23K 9/10
[52] U.S. Cl. ................................. 219/130.1; 219/133; 219/137 PS; 320/15
[58] Field of Search ..................... 219/130.1, 133, 134, 219/136, 137 PS; 320/15

[56] References Cited

U.S. PATENT DOCUMENTS

| | | | |
|---|---|---|---|
| 1,719,112 | 7/1929 | Holslag | 219/134 |
| 2,661,428 | 12/1953 | Aversten | 219/133 |
| 3,676,694 | 7/1972 | Schneider et al. | 219/134 |
| 3,770,976 | 11/1973 | Stroud et al. | 219/133 |

FOREIGN PATENT DOCUMENTS

| | | | |
|---|---|---|---|
| 5522456 | 8/1978 | Japan | 219/130.1 |
| 54-155950 | 12/1979 | Japan | 219/130.1 |
| 530857 | 6/1939 | United Kingdom | 219/130.1 |

Primary Examiner—Clifford C. Shaw

[57] ABSTRACT

An arc welder, designed to receive its source of power from a vehicle's alternator through a special controlled battery charger. The first portion of energy used in welding comes from the vehicle's battery charger and the balance of energy used in welding comes from the welder's battery pack. Between spurts of actual welding, the welder's batteries are re-charged by the vehicle's special controlled battery charger. The batteries in said battery pack are so arranged as to give the operator a choice of voltage for welding and inductors are used to control the current. Also, the batteries can be used direct by by-passing said inductors for extra-heavy cutting and/or extra-heavy duty welding thus giving the operator an extremely wide range of current to fit his needs.

4 Claims, 1 Drawing Figure

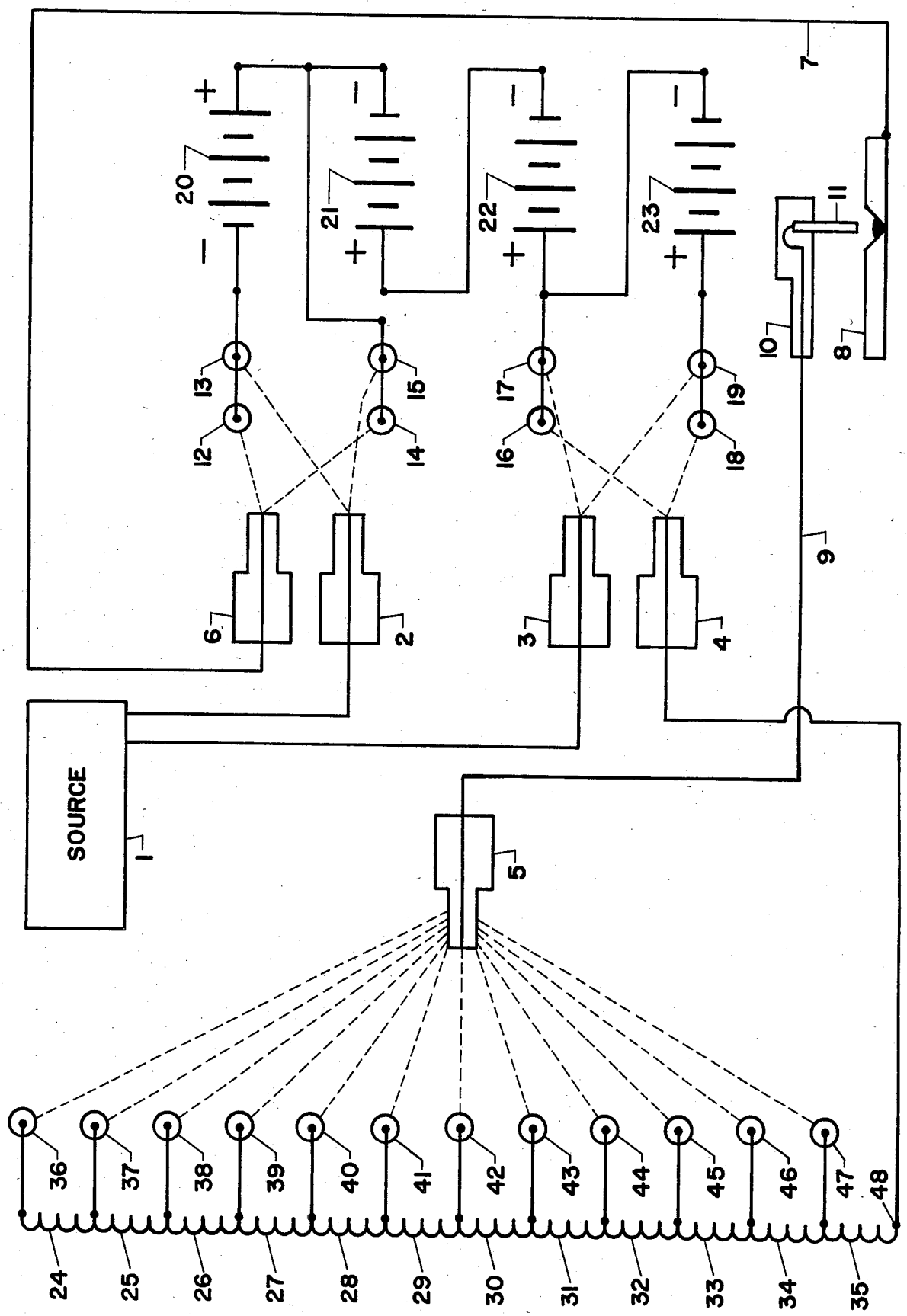

VEHICULAR ARC WELDER

CROSS-REFERENCE TO RELATED APPLICATIONS

The invention herein is related to my Vehicular Battery Charger U.S. patent application Ser. No. 321,920 filed Nov. 16, 1981 now U.S. Pat. No. 4,449,089. These two patent applications are related to the extent that the arc welder receives its source of power from said Vehicular Battery Charger.

BACKGROUND OF THE INVENTION

1. Field of the Invention

The present invention relates to a method and/or apparatus for arc welding that can be used anywhere a vehicle can go.

2. Description of the Prior Art

It is common knowledge that arc welders are presently available that can be used in remote locations. The problem(s) with the ones that I have knowledge of is; some of these are self-contained in a framework with its own battery; motor, generator, fuel tank, etc., thus making it big, heavy, cumbersome and expensive. Especially for a welder that can handle heavy-duty welding. Another arc welder uses the vehicle's standard alternator and is equipped with a circuit breaker. The main problem with this arc welder is that it has a very limited use. I understand there is another such arc welder which requires changing the vehicle's alternator and replacing it with a special heavy-duty alternator. The knowledge I have about this arc welder is hear-say and I don't think it is right to list the hear-say problems of said arc welder. I realize that there is probably a number of other types of arc welders that can be used in remote locations that I have no knowledge of.

SUMMARY OF THE INVENTION

The object of my invention was to work for a new and/or better arc welder. (Please keep in mind, what is better for some is not necessarily better for others.) From time to time it is desirable to have an arc welder that can be used anywhere, and you are not always around AC power. The present invention solves this problem by making use of the vehicle's alternator and special controlled battery charger as a source of power. Further object of the present invention was to build this arc welder with a number of additional desirable features; 1. The arc welder can be built-in, becoming a permanent part of said vehicle thus permitting full use of the floor space. 2. Provides an extremely wide range of current capabilities for light-duty through extra-heavy duty welding. 3. Inductors are used for controlling the current thus giving a very stable arc. 4. The batteries can be used direct for extra-heavy cutting and/or extra-heavy duty welding. 5. The battery pack provides a selection of four different voltages. 6. Reasonably economical. I feel the afore-mentioned features of my present invention also solves the problems stated in the prior art.

BRIEF DESCRIPTION OF THE DRAWING

In the drawing, the broken lines shown between the jack plugs and the jacks, points to the different jacks that that jack plug can be plugged into to obtain the different current levels as well as the different voltage levels for welding. Also, the welding cables can be reversed for straight polarity.

DESCRIPTION OF THE PREFERRED EMBODIMENT

My invention is an apparatus for arc welding referred to throughout the embodiment as vehicular arc welder, arc welder or simply welder. Definition of terms used: Vehicle—means automobile type vehicle; Arc amps—means the upper-limit average of the amperage consumed during actual welding; Operator—means the person doing the welding; Welder—means the vehicular arc welder; Duty cycle—means what percentage of time the welder can be used at a given amperage; Light duty welding—means the welder uses light current and small welding rod; Heavy duty welding—means the welder uses high current and large welding rod up to ¼ inch and including most ¼ inch rod, for example, 6013 through 7018 electrodes.

Means of connecting to a source #1 of power for operation of the vehicular arc welder. The present invention requires its source of power from a vehicle's alternator on through a special controlled battery charger, of which makes up the source of power.

One such source of power is listed in the Cross-Reference to related Applications. A short rundown on said battery charger's special controls that are used in said source of power for said arc welder: 1—Ammeter. 2—Voltmeter. 3—Said battery charger utilizes the alternator of the vehicle that said battery charger has been installed in, thus permitting said alternator to charge either the internal battery system of said vehicle or to charge an external battery or batteries. 4—Said battery charger has an overload protector, which is an adjustable current limiter, thus permitting said battery charger to produce a pre-determined maximum current level and then regulating said battery charger's output current at said predetermined current level. 5—Said battery charger has a voltage sensor that senses the voltage of the external battery or batteries being charged, said voltage sensor is adjustable, thus providing means for a sensed, controlled, pre-set charge level for said external battery(s).

It is very important that this source of power has a well controlled voltage for each voltage level that is used in welding for charging the batteries. Overcharging batteries results in excessive loss of the battery water which can cause internal damage to said batteries, excessive gassing which increases the danger of explosion, decreases battery life and can result in warping of the cell plates which may cause internal shorting. The arc welder has its own battery pack consisting of; one six volt battery and three twelve volt batteries, group 24 or 27 automotive batteries or equivalent to are recommended. The batteries are used in series with the six volt battery #20 on one end and said battery positive terminal is connected in series to the negative terminal of battery #21 and said battery positive terminal is connected in series to the negative terminal of battery #22 and said battery positive terminal is connected in series to the negative terminal of battery #23. The battery pack further consists of eight single conductor taper lock type jacks with the first two of said jacks #12 and #13 connected in series to the negative terminal of battery #20 and the next two of said jacks #14 and #15 connected in series to the negative terminal of battery #21 and the next two of said jacks #16 and #17 connected in series to the positive terminal of battery #22 and the last two of said jacks #18 and #19 connected in series to the positive terminal of battery #23. This completes the making up of the battery pack. The battery pack uses a floating ground, by doing this it permits a choice of four different input voltage levels 24, 30, 36 or 42 volts for the operator in his welding needs. Since batteries are known for their ability to store energy, I feel this needs no explanation.

Inductors are used for controlling the current used in welding. Also, said inductors can be by-passed thus using the batteries direct for cutting, heavy duty or extra-heavy duty welding if desired. As shown in the drawing, there are twelve inductors all wired in series with the first one of said inductors #35 value chosen to produce 300 arc amps at 36 volts input. All of said inductors value is based on an input voltage of 36 volts and with the output shorted and then cut in half for the arc amps. For example, 280 amps shorted would equal 140 arc amps. This figure is not exact however straight through is close as compared with other arc welders. Going on, the remaining inductors' ratings are; #34=255 amps, #33=225 amps, #32=200 amps, #31=180 amps, #30=160 amps, #29=140 amps, #28=120 amps, #27=100 amps, #26=80 amps, #25=60 amps, #24=40 amps. Inductors are known for their ability to store energy on their loaded portion of a cycle and induce a voltage when the load is reduced or removed from the inductor and their induced voltage always tends to oppose the change in current which produces it. Since inductors oppose a change in current, this is why I feel by using inductors to control the current in welding results in a very stable arc while welding. In actual welding, it is the arc that keeps the current changing that makes the inductors effective. The above stated reasons are why I feel that inductive resistance is better for controlling the current for welding than pure resistance is for controlling the current for welding in an arc welder of this type.

Going back to the source of power, the said source of power is entered through the negative line jack plug #2 and the positive line jack plug #3. The said negative plug #2 is connectable to one of a choice of two jacks #13 or #15 on the battery pack. The said positive plug #3 is connectable to one of a choice of two jacks #17 or #19 on the battery pack.

Going back to the blank end of the first inductor, #35 is connected in series to the jack plug #4 and said plug #4 is connectable to one of a choice of two jacks #16 or #18 on the battery pack of which is the positive power line for powering the inductors. Twelve jacks taper lock type to be connected, eleven of them are connected one each at the point of in between each inductor and the twelfth of said jacks is connected on the blank end of inductor #24.

Energy is taken from the arc welder through two standard welding cables #7 and #9. I will list said welding cables as pictured in the drawing, however they can be reversed for straight polarity and since all DC welders have this, it needs no explanation. One of said two welding cables #9 has a jack plug #5 on one end and an electrode holder #10 on the other end. The other welding cable #7 has a jack plug #6 on one end and a work clamp #8 on the other end. The said welding cable #7 with plug #6 is connectable to one of a choice of two jacks #12 or #14 on the negative voltage end of the battery pack. The other said welding cable #9 with plug #5 is connectable to one of a choice of the twelve inductor jacks #36 through #47 for the desired current for welding. As said before the inductors can be by-passed and use the batteries direct. In order to do this, unplug the inductors' power line jack plug #4, also unplug the inductors' jack plug (shown in the drawing #5) and re-plug it back into one of a choice of two jacks #16 or #18 on the positive voltage end of the battery pack. Since there is no circuit breaker in the batteries when used direct, said batteries are very powerful and they will burn the electrode #11 clear of a short with just using a little care in working.

The arc welder's duty cycle depends on: The amperage used in welding, the source of power output amperes, the size and strength of the batteries used and how well the inductors are cooled. There seems to be no problem at all with the batteries heating as long as they are not over-charged. The charge level I used was 2.42 volts per cell and I charged the same number of cells that I used in welding.

| VEHICULAR ARC WELDER TEST MODEL | | | | |
|---|---|---|---|---|
| Coil # | Wire Length | Ohms | Amps | Wire Gauge |
| 1- | 153 ft. | .06 | 300 | #6 |
| 2- | 25 ft. | .07 | 255 | #6 |
| 3- | 25 ft. | .08 | 225 | #6 |
| 4- | 25 ft. | .09 | 200 | #6 |
| 5- | 25 ft. | .1 | 180 | #6 |
| 6- | 20 ft. | .1125 | 160 | #8 |
| 7- | 26 ft. | .1286 | 140 | #8 |
| 8- | 34 ft. | .15 | 120 | #8 |
| 9- | 30 ft. | .18 | 100 | #10 |
| 10- | 45 ft. | .225 | 80 | #10 |
| 11- | 75 ft. | .3 | 60 | #10 |
| 12- | 150 ft. | .45 | 40 | #10 |

I made the coils in the test model from bare soft drawn solid copper wire and coated said wire so it wouldn't short out. All coils are single-layer wound with 3 of the heavy powered coils on one 4 in. diameter core and the next 8 coils on another 4 in. diameter core and the last coil is on a 2 in. diameter core. The first of said 3 coils are placed along one side of the vehicle's motor and the next said 8 coils are placed on the other side of said motor. 11 of the inductors are cooled by the vehicle's fan. Also, I placed the jacks from the batteries as well as the inductors' jacks on a panel under the hood. I used 4 recessed floor-mount battery holders with covers and placed them in the floor across the front part of the pick-up bed, using Sears Diehard batteries ®, one 6 volt group size 4 and three 12 volt group size 27 batteries. I used all copper wiring and extra heavy battery cables.

I checked out the possibility of using the batteries direct, changing to different voltages for different temperatures and using said batteries for all levels of welding. I found that the batteries are no good using them directly for light or medium duty welding as they are just too hot. However, for heavy and extra heavy duty welding or cutting they work good. Especially for flat surface welding.

Various changes may be made in the details of construction without departing from the spirit and scope of my invention as defined by the appended claims.

Having thus described my invention, I claim:
1. A vehicular arc welder comprising:
 a battery pack comprised of four series connected individual batteries, the battery pack including a terminal connected at each pole of the jack and including two other terminals, each connected to an interconnection of individual batteries in the battery pack;

each of said terminals of the battery pack having two single conductor taper lock type jacks connected thereto, whereby two separate jack plugs may be selectively connected to each terminal;

a battery charger having two output cables each connected to a jack plug, these two jack plugs connected to two selected terminals of the battery pack, each plug being plugged into one of the two jacks at each terminal;

an inductive means comprised of twelve inductors connected in series, each interconnection of the inductors and the end of the first inductor which is not connected to another inductor being connected to a single conductor taper lock type jack, the end of the twelveth inductor which is not connected to another inductor being connected to a jack plug, this jack plug of the inductive means being plugged into one of the two jacks at a selected terminal of the battery pack, two welding cables, one welding cable having a workpiece clamp connected at one end and having a jack plug at the other end, this jack plug being plugged into one of the two jacks at a selected terminal of the battery pack, the other welding cable having an electrode holder connected to one end and a jack plug at the other end, this jack plug being plugged into a selected one of the jacks of the inductive means.

2. A vehicular arc welder according to claim 1 further including means for installing said arc welder in an automobile type vehicle.

3. A method of welding or cutting with a vehicular arc welder comprising the following steps:
  providing power from a vehicle's alternator to a battery charger;
  providing a battery pack comprised of four individual batteries connected in series;
  providing a changeable connection of said battery charger to selected batteries in the battery pack;
  providing an inductive means with plural output terminals to allow for the selection of plural inductance values;
  changeably connecting one terminal of said inductive means to a selected battery in the battery pack;
  changeably connecting a workpiece to a selected battery in the battery pack whereby the above mentioned connections to the battery pack determine the voltage level for the welding or cutting operation;
  changeably connecting an electrode to a terminal in the inductive means to select a current used for the welding or cutting operation;
  performing the welding or cutting operation.

4. The method of claim 3 further including the step of bypassing the inductive means by connecting the electrode directly to a selected battery or the battery pack, thereby providing a high current for heavy duty welding or cutting.

* * * * *